United States Patent [19]
Larson et al.

[11] Patent Number: 5,770,933
[45] Date of Patent: Jun. 23, 1998

[54] BLOWER MOTOR WITH ADJUSTABLE TIMING

[75] Inventors: Donald Glenn Larson, San Diego; Tom Arthur Watson, Carlsbad, both of Calif.

[73] Assignee: Cymer, Inc., San Diego, Calif.

[21] Appl. No.: 969,387

[22] Filed: Nov. 13, 1997

Related U.S. Application Data

[63] Continuation of Ser. No. 594,571, Jan. 31, 1996, abandoned.

[51] Int. Cl.[6] .............................. H02K 29/08; H01S 3/22
[52] U.S. Cl. ........................... 318/254; 372/58; 372/109; 310/48
[58] Field of Search ..................................... 318/138, 254, 318/439, 491, 700, 720, 721; 310/42, 48, 52, 58, 62, 63, 156; 372/55, 57, 58, 65, 103, 109

[56] References Cited

U.S. PATENT DOCUMENTS

| | | | |
|---|---|---|---|
| 3,719,865 | 3/1973 | Ott et al. | 318/254 |
| 3,809,935 | 5/1974 | Kristen et al. | |
| 4,086,519 | 4/1978 | Persson | 318/254 |
| 4,099,143 | 7/1978 | Foster. | |
| 4,730,150 | 3/1988 | Lee et al. | 318/254 |
| 4,763,050 | 8/1988 | Ruppert | 318/254 |
| 4,862,044 | 8/1989 | Karashima et al. | |
| 4,891,818 | 1/1990 | Levatter | 372/57 |
| 4,959,840 | 9/1990 | Akins et al. | 372/57 |
| 5,048,041 | 9/1991 | Akins et al. | |
| 5,291,087 | 3/1994 | Pollick et al. | |
| 5,377,215 | 12/1994 | Das et al. | |

FOREIGN PATENT DOCUMENTS

| | | |
|---|---|---|
| 0 361 394 A2 | 9/1989 | European Pat. Off. |
| 3813064 A1 | 11/1989 | Germany. |
| 01055041 | 3/1989 | Japan. |

*Primary Examiner*—Bentsu Ro
*Attorney, Agent, or Firm*—David G. Beck

[57] ABSTRACT

A brushless DC motor with an adjustable timing feature is provided. The timing adjustment allows a specific motor's performance to be optimized by compensating for individual variations both in the characteristics of the rotor position sensors as well as in their locations. The rotor position sensors may be affixed to a heat sink within a portion of the motor housing. To improve the cooling efficiency of the heat sink at least a portion of the motor housing to which the heat sink is thermally coupled is cooled through either active or passive cooling. The rotor position sensors may be enclosed by a structure which improves their thermal and electrical isolation. A means of monitoring and controlling the speed of the motor is also provided.

15 Claims, 13 Drawing Sheets

| FIG. 12A. | FIG. 12B. | FIG. 12C. | FIG. 12D. |
| --- | --- | --- | --- |
| FIG. 12E. | FIG. 12F. | FIG. 12G. | FIG. 12H. |

BLOWER MOTOR WITH ADJUSTABLE TIMING

This is a Continuation of application Ser. No. 08/594,571, filed Jan. 31, 1996, now abandoned.

The present invention relates generally to brushless DC motors and, more particularly, to a brushless DC motor driven blower-type axial fan used for the circulation of a gas within a laser cavity.

BACKGROUND OF THE INVENTION

As the desired feature sizes on integrated circuits have grown smaller, the demands on optical lithography techniques have grown greater. These demands have led to the development of near diffraction limited optical projection systems as well as the exploration of a variety of illumination sources. Given equivalent optical systems, illumination sources operating at shorter wavelengths are more desirable than those operating at longer wavelengths due to their ability to form smaller features. Gas discharge lasers, particularly excimer lasers, are uniquely suited for such applications due to the combination of short discharge wavelength with high power. For example, the wavelength of a KrF excimer laser is approximately 248.4 nanometers.

Excimer lasers generally operate in a pulsed mode. Pulsing is required to provide the gas within the discharge region sufficient time to return to the ground or initial thermal state. In a static gas system, the gas may take times on the order of a second to reach this state, thus severely limiting the repetition rate. Modern laser systems achieve higher repetition rates by actively circulating the gas within the gas discharge region, typically using a tangential blower fan to circulate the gas.

The rate of gas flow necessary to support a specific repetition rate can be determined using the following equation:

$$\text{Clearing Ratio} = \frac{\text{(Flow Rate)}}{[(\text{Discharge Width})(\text{Repetition Rate})]}$$

Commonly a clearing ratio of 3 is considered adequate to obtain a stable discharge. However, a clearing ratio of 5 to 6 is preferred to insure pulse-to-pulse energy stability. In order to attain the clearing ratios necessary to support repetition rates on the order of 1000–2000 hertz, high gas flow rates and therefore high blower fan speeds are required. Since doubling the speed of the blower fan results in an eight fold increase in the input power to the motor, high blower fan speeds generally result in increased motor and motor coupling complexity and decreased motor life. The primary factor responsible for lowering the motor's life expectancy is the increased operational heat of the motor.

From the foregoing, it is apparent that an improved blower fan motor capable of efficiently running at high speeds is desired.

SUMMARY OF THE INVENTION

The present invention provides a brushless DC motor with an adjustable timing feature. The timing adjustment allows a specific motor's performance to be optimized by compensating for individual variations in the operating characteristics of the rotor position sensors and/or in their locations.

In one embodiment of the invention the end cap of the stator housing contains three rotor position sensors. The end cap can be rotated about the central axis of the rotor, thereby altering the position of the sensors with respect to the stator. Once the location of the sensors has been optimized, the position of the assembly with respect to the stator housing can be fixed.

In another embodiment of the invention the rotor position sensors are affixed to a heat sink within a portion of the motor housing. To improve the cooling efficiency of the heat sink at least a portion of the motor housing to which the heat sink is thermally coupled is cooled. The cooling can either be active or passive. Active cooling techniques include the use of thermoelectric coolers. Passive cooling techniques include increasing the cooling area of the assembly, preferably through the use of cooling fins.

In another embodiment of the invention a structure enclosing the rotor position sensors is used to improve the thermal and electrical isolation of the sensors.

In another embodiment of the invention two brushless DC motors are coupled to a single drive shaft. A single command signal is simultaneously sent to both motors, the command signal controlling the drive current applied to the motors. By sending the same signal to both motors the division of the load between the motors is approximately equal. The command signal is automatically varied in order to obtain a desired drive shaft speed.

In another embodiment of the invention the drive shaft speed is continually monitored and compared to a preset maximum limit. If the drive shaft speed equals or exceeds the preset limit the motors are temporarily disabled.

A further understanding of the nature and advantages of the present invention may be realized by reference to the remaining portions of the specification and the drawings.

DESCRIPTION OF THE PREFERRED EMBODIMENT

Figure 1:
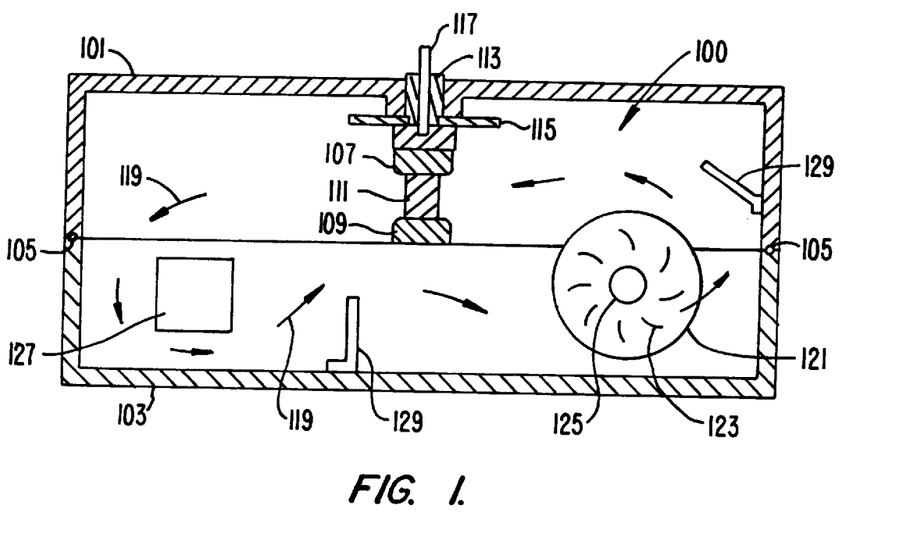
FIG. 1 is an illustration of a compact excimer laser according to the prior art in which a brushless DC motor is used to power a fan circulating gas within the laser cavity.

Brushless DC motors are used in a variety of applications, including gas laser systems. FIG. 1 is an illustration of a compact excimer laser in which a brushless DC motor is used to power a fan which circulates gas within the laser cavity. For a more detailed discussion of this type of laser, see U.S. Pat. No. 4,959,840 assigned to the assignee of the present invention and incorporated in its entirety herein by reference. For completeness and to insure understanding of the present invention in this single document, certain design features of this particular laser design will be outlined here before discussing the details of the invention. The present invention is not, however, solely applicable to excimer laser systems in particular, or laser systems in general.

FIG. 1 is an end view of an excimer laser of a particular design. Laser cavity 100 is formed from two housing halves, 101 and 103. Housing halves 101 and 103 are sealed with an O-ring 105 of fluorine and/or chlorine resistant material. Within cavity 100 is a cathode 107 and an anode 109. When a high voltage is applied across the electrodes, an electric discharge is formed within area 111 across a mixture of gases, generally consisting of a rare gas such as krypton (Kr), a halogen such as fluorine (F), and a buffer gas such as helium (He) or neon (Ne). It is within area 111 that, as a result of the excitation of the rare gas and halogen, high energy ultraviolet pulses are generated due to the decay of the excimer molecule thus formed. The pulses are produced along an axis located between cathode 107 and anode 109. Insulators 113 and 115 insulate cathode 107 and high voltage line 117 from walls 101 of cavity 100.

In an excimer laser, the pulse rate is typically quite low. If the gas is static, the gas volume within the discharge area must be given sufficient time to return to its initial thermal state between laser pulses. Generally this return time is on the order of one second, thus limiting the pulse rate in a static gas system to approximately 1 pulse per second. If the gas is circulated the pulse rate can be increased. The repetition rate at which the laser can be discharged depends upon the circulation velocity and the rate at which the gas volume within the discharge volume is exchanged. Thus, the higher the circulation velocity, the higher the achievable repetition rate.

In a laser system such as that illustrated in FIG. 1, gas is circulated throughout cavity 100 following gas flow lines 119. A fan 121, comprised of a plurality of fan blades 123 extending parallel to a fan axis 125, force the circulation of the gas along flow lines 119. After the gas has been excited in discharge area 111, the circulating gas is cooled using a heat exchanger 127. The directional flow of gas is controlled using one or more control vanes 129. Optionally, a portion of the circulating gas can be siphoned off for purification with a filter (not shown), thus extending the life of the gas contained within cavity 100.

Figure 2:
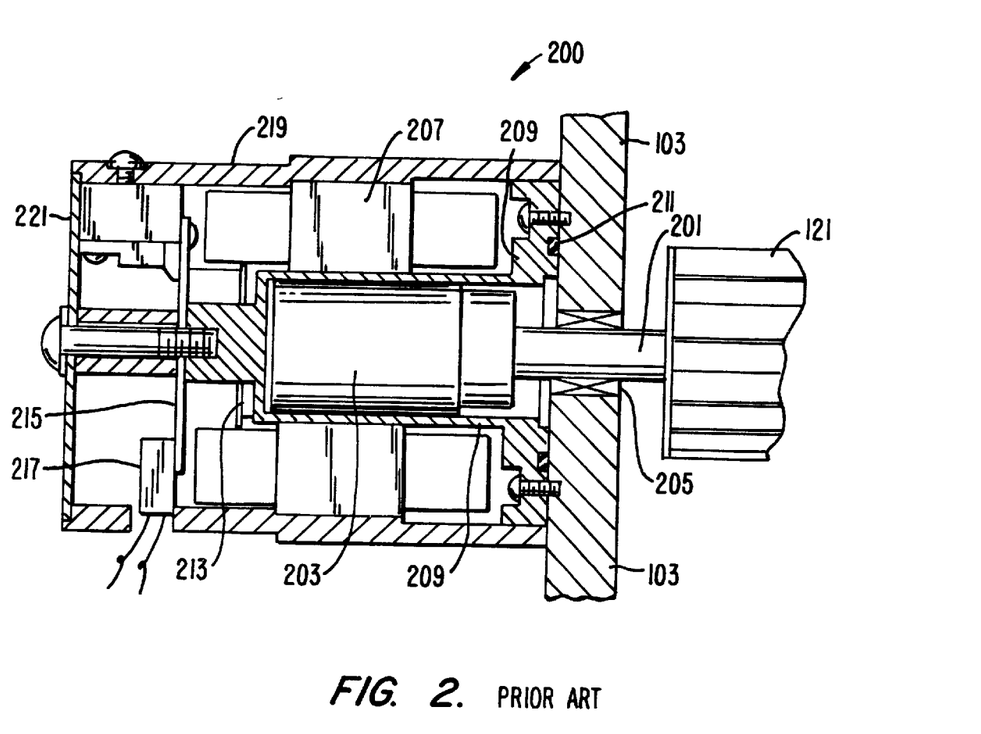
FIG. 2 is an illustration of a fan motor mounted outside of an excimer laser cavity according to the prior art.

In order to minimize damage to the fan motor caused by the corrosive laser gas, and therefore extend the expected life of this system component, the motor used to drive fan 121 in an excimer laser such as that shown in FIG. 1 is preferably mounted outside of cavity 100. FIG. 2 is an illustration of a prior art approach to mounting an exterior DC brushless motor 200 to drive fan 121.

Fan 121 is coupled to a drive shaft 201. At the end of drive shaft 201 is a rotor 203. Shaft 201 passes through a bearing structure 205 mounted into the cavity wall 103. Surrounding rotor 203 is a stator 207 comprised of a series of windings. In order to prevent the corrosive gases within cavity 100 from passing through bearing structure 205 and into the stator assembly 207, a sealing assembly 209 completely encompasses rotor 203. Sealing assembly 209 is constructed of a corrosive resistant material such as stainless steel and is sealed to cavity wall 103 with a corrosive resistant O-ring 211.

Mounted next to sealing assembly 209 and in close proximity to rotor 203 is at least one rotor position sensor 213, such as a Hall sensor. Hall sensors are sensitive to magnetic fields, generating an output voltage which is proportional to the strength of the magnetic field. Hall sensors, as described herein for use in the present invention, are commercially available from companies such as Honeywell®. The operation of such sensors is well known by those of skill in the art. Hall sensor 213 is able to detect the rotational position of the magnets within rotor 203, the output signal of this detector being fed back to a circuit board 215. Circuit board 215 directs the power from a power input connector 217 to the stator 207. The motor assembly is held in place with a stator housing 219 and an end plate 221.

Figure 3:
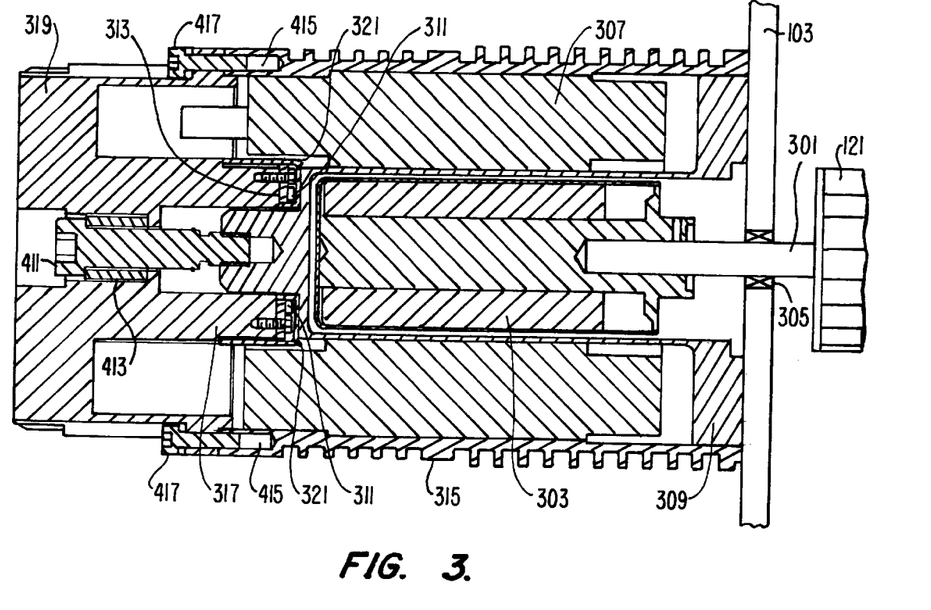
FIG. 3 is an illustration of a DC brushless motor according to the present invention.

FIG. 3 is an illustration of a DC brushless motor according to the present invention. Due to the improved heat dissipation and protection offered by this configuration, the motor and associated electronics are capable of sustaining speeds greater than 4000 RPM in one embodiment. As in the prior art motor assembly, this system has the primary components of a drive shaft 301, a rotor 303, a shaft bearing 305, a stator 307, a sealing element 309, Hall sensors 311, a circuit board 313, and a stator housing 315. In this configuration Hall sensors 311 are mounted directly onto circuit board 313, circuit board 313 being mounted to a heat sink portion 317 of end cap 319. Preferably end cap 319 and associated heat sink portion 317 are constructed of a material with high thermal conductivity such as copper or aluminum, thus efficiently drawing heat away from circuit board 313 and its integral sensors 311. Circuit board 313 and sensors 311 are mounted to portion 317 using well known techniques for maximizing thermal contact while avoiding electrical shorts.

In order to minimize the heat flow from stator 307, rotor 303, and sealing element 309 to circuit board 313 and sensors 311, the preferred embodiment of the invention includes an insulator cap 321. Insulator cap 321 fits over a section of portion 317, thereby enclosing both the circuit board and the sensors. In the preferred embodiment, insulator cap 321 is constructed of a polyimide material, such as Ultem® 1000 resin, having good electrical insulating properties as well as good thermal insulating properties. Therefore in this embodiment cap 321 not only reduces the amount of heat absorbed by board 313 and sensors 311, but also limits the possibility of shorting out circuit board 313.

Figure 4:
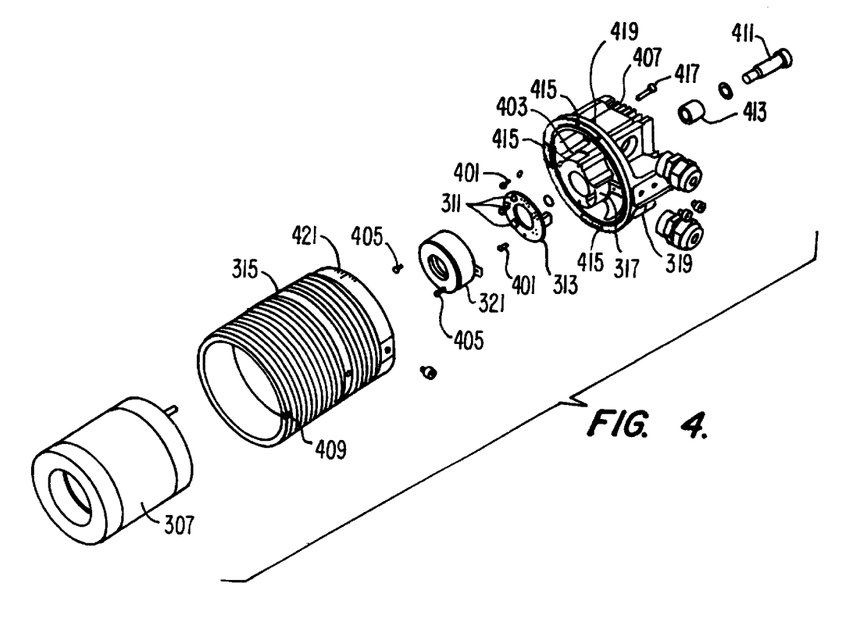
FIG. 4 is an exploded view of the preferred embodiment.

FIG. 4 is an exploded view of the preferred embodiment. This view clearly shows circuit board 313 and Hall sensors 311. In this embodiment there are three Hall sensors, thus uniquely defining the location of the rotor. Board 313 is mounted to heat sink portion 317 with bolts 401. Insulating cap 321 fits over portion 317, resting on lip 403, and is held in place with bolts 405.

In order to maximize the cooling capacity of end cap 319 and its associated heat sink 317, a section 407 of cap 319 is finned. The fins increase the surface area of cap 319, thereby increasing the possible heat flow through surrounding air. If further cooling is required cap 319 can be actively cooled, for example with thermoelectric coolers (not shown), or forced convection.

The position of the rotor is determined using non-contacting sensors, preferably at least three Hall sensors. This positional information is important in order to properly time the application of power to the stator, thereby maximizing the efficiency of the motor. However, in order to achieve optimal motor performance the system must be calibrated.

Figure 5:
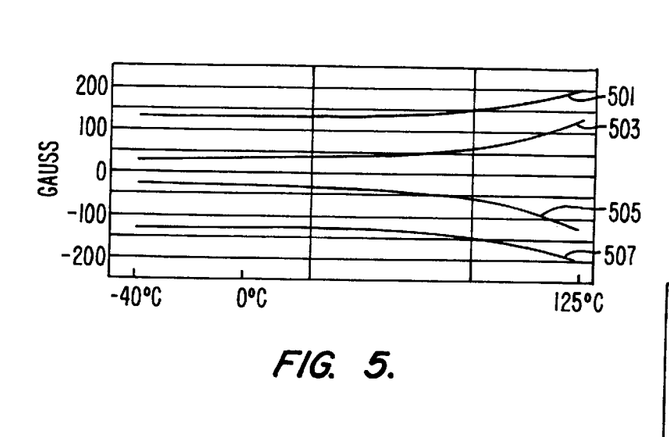
FIG. 5 is a graph of the operate and release characteristics shift of a Hall sensor over temperature.

Calibration is required for a variety of reasons. First, Hall sensors have minor performance variations due to manufacturing tolerances. Second, the operate and release characteristics of these sensors shift as a result of temperature changes. This shift is illustrated in the graph of FIG. 5. Curves 501 and 503 indicate the shift in maximum and nominal operate characteristics, respectively, as the temperature is increased. Similarly, curves 505 and 507 indicate the shift in the nominal and minimum release characteristics, respectively, as the temperature is increased.

The effects of the performance variations of the Hall sensors are exacerbated by the mounting location of the sensors for particular applications. For example, as previously described the motor used to drive a blower fan in an excimer laser system is often mounted outside of the laser cavity. In order to reduce the corrosive effects of the gas on the motor's components, a sealing element is interposed between the rotor and the stator as illustrated in FIGS. 2–3. Unfortunately the sealing element increases the separation distance between sensors 311 and rotor 303 thereby decreasing the magnetic field strength at the location of the sensors. The separation distance is further increased due to insulating cup 321. The magnetic field strength is also reduced due to the placement of the sensors at the end of the rotor. Lastly, mounting variations in sensors 311 and circuit board 313 may also lead to varying performance characteristics.

Variations in sensor operating characteristics can be accounted for by altering the circuit which controls the phase of the power to the stator. However, in the preferred embodiment of the present invention such variations are accounted for by physically adjusting the position of sensors 311 relative to that of stator 307. As previously described, sensors 311 are rigidly attached to circuit board 313 which is, in turn, rigidly attached to end cap 319. On the other hand, stator 307 is held rigid with respect to exterior wall 103. In this embodiment stator 307 is fixedly attached to stator housing 315. Housing 315 fits over the flange of sealing element 309. A slot 409 at the edge of housing 315 fits over a pin (not shown) in the flange of element 309.

In the configuration illustrated in FIGS. 3 and 4, end cap 319 and stator 307/stator housing 315 are fixed to the laser cavity by a single assembly bolt 411 and a compression spring 413. Bolt 411 passes through the center of end cap 319 and is threaded into an end portion of sealing element 309. Element 309 is attached to cavity exterior wall 103 by eight bolts (not shown). End cap 319 contains three slots 415 which permit it to rotate around the center axis of the motor assembly, thereby allowing the timing of the motor to be varied. Passing through each slot 415 is a bolt 417, these bolts threaded into housing 315.

In order to adjust the timing of the motor, bolts 411 and 417 must be sufficiently loosened to allow cap 319 to rotate with respect to stator housing 315. The length of slots 415 determine the degree of rotation permitted. The outside edge of end cap 319 contains a null indicator marking 419. Preferably, the permitted degree of rotation on either side of null marking 419 is within about 10 degrees. By comparing mark 419 with the set of rotational degree markings 421 contained on the outside edge of housing 315, the operator is able to determine the degree of rotation which was necessary to properly time the motor. Of course, other mechanisms for adjustment are easily developed based on this disclosure.

Figure 6:
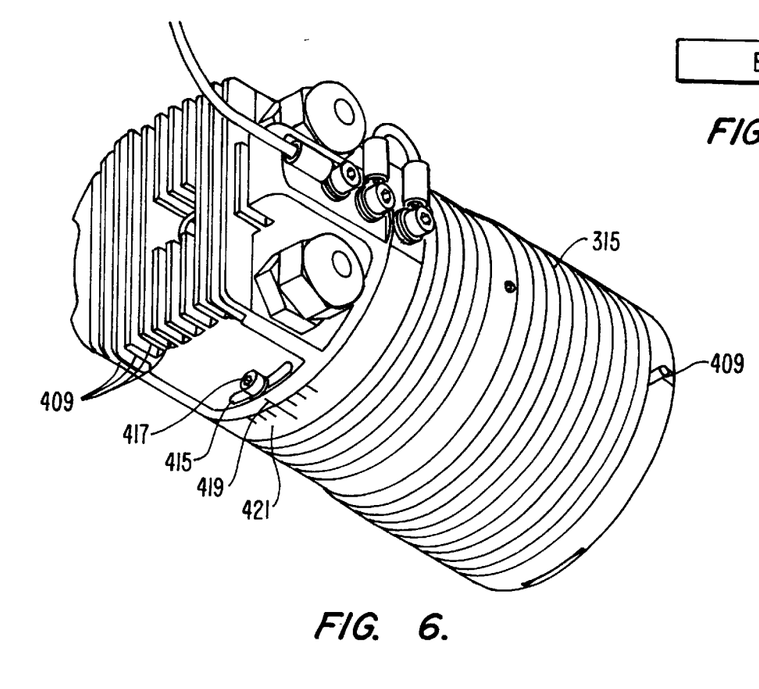
FIG. 6 is an illustration of an exterior view of an assembled motor according to the present invention.

FIG. 6 is an illustration of an assembled motor which is ready for mounting. In this figure a timing slot 415/bolt 417 combination is clearly visible as are timing marks 419 and 421. In this embodiment only the end portion of cap 319 contains cooling fins 407.

Figure 7:
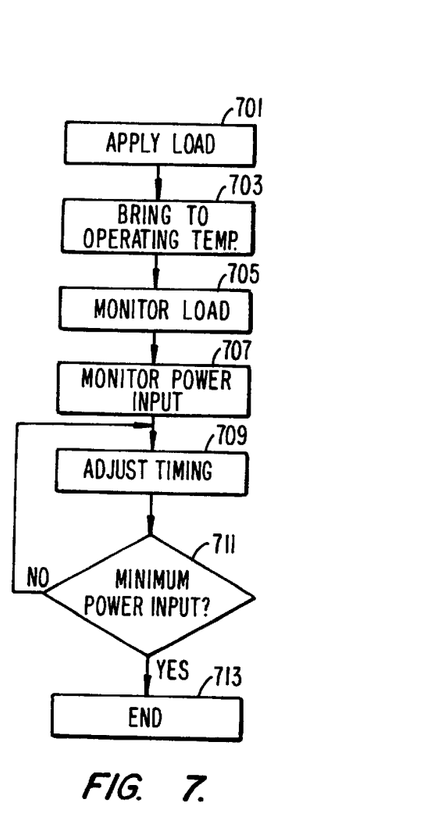
FIG. 7 is a flow diagram of the procedure used to time the preferred embodiment of the invention.

FIG. 7 is a flow diagram of the procedure used to time the preferred embodiment of the invention. The first step is to apply an appropriate load to the motor assembly (Step 701). This load should equal the expected load. The load can either be the actual load, for example that resulting from operating an excimer laser such as that shown in FIG. 1, or the load can be simulated. The motor assembly shown in FIGS. 3–5 is ideally suited to the use of simulated loads for several reasons. First, the stator, stator housing, end cap, and all associated electronics and sensors are contained in a single assembly. Second, due to the 'non-contact' design of this motor, the outer motor assembly can easily be affixed to a testing assembly. The testing assembly simply requires a rotor and sealing element identical to that used in the actual motor assembly onto which the outer assembly can be attached. Third, the timing of the motor is relatively independent of the rotor, thus allowing the outer motor assembly to be timed and used with any rotor/sealing element combination under the same load conditions. In the preferred embodiment of the invention, a Magtrol Dynamometer Model HD-710 operating under the appropriate speed and load conditions is used to simulate the load.

After the appropriate load conditions are applied, the motor must warm up to its normal operating temperature (Step 703) to allow for the shift in the operate/release characteristics of the sensors as previously described. For the excimer laser blower fan application described above, an operating temperature of 70° C., measured on the stator housing, is considered normal operating temperature. During timing adjustment the applied load is monitored to insure that it remains constant (Step 705) at the same time that the input power to the stator is monitored (Step 707). The timing of the motor is then adjusted (Step 709) by minimizing the power input (Step 711). When the minimum stator power input is obtained, the timing procedure is complete (Step 713). In the preferred embodiment, the timing adjustment is made by loosening bolts 417, rotating end cap 319 with respect to stator housing 315, and retightening bolts 417 to allow further testing. Positioning of alignment marks 419 and 421 is then recorded for production quality control purposes.

Figure 8:
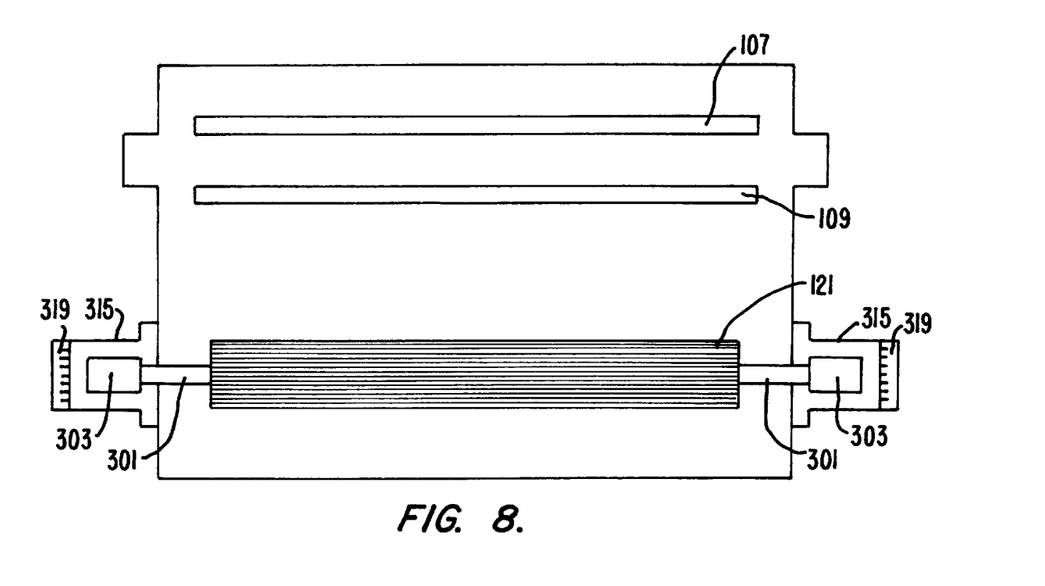
FIG. 8 is an illustration of an embodiment of the invention in which two brushless DC motors are coupled to a single blower fan drive shaft.

FIG. 8 is an illustration of an embodiment of the invention in which two brushless DC motors are used to power a single blower fan within an excimer laser cavity. In this embodiment drive shaft 301 of fan 121 is directly coupled at either end to a rotor 303 within a stator housing 315/end cap 319 assembly. Since both motors are directly coupled to the same fan shaft, the motor control circuitry is important in order to avoid excessive loading of one or both motors.

Figure 9:
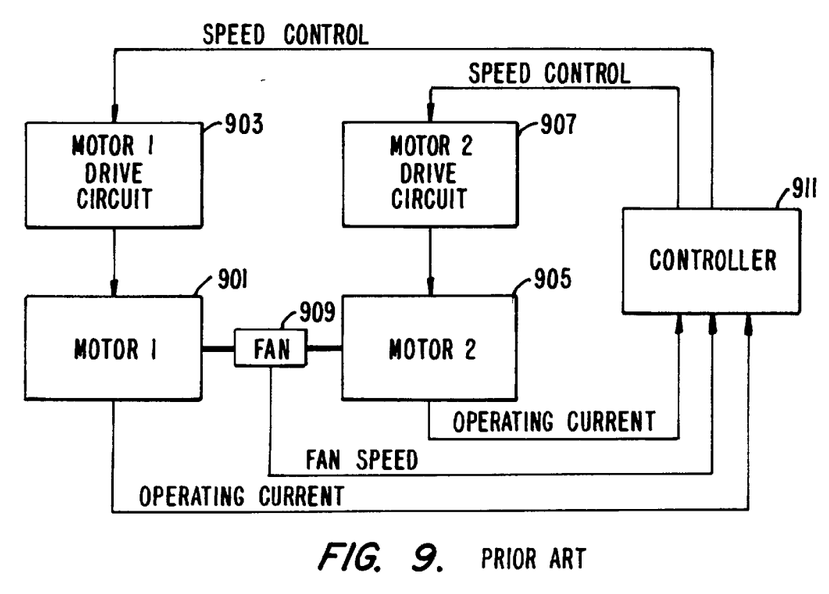
FIG. 9 is a block diagram illustrating the prior art approach to controlling a dual motor driven fan such as that illustrated in FIG. 8.

FIG. 9 is a block diagram illustrating the prior art approach to controlling a dual motor driven fan such as that illustrated in FIG. 8. A first motor 901 is driven by a motor drive circuit 903 and a second motor 905 is driven by a second motor drive circuit 907. Motors 901 and 905 drive a single fan 909. The system also contains a controller 911. During laser operation, controller 911 monitors the current of both motors 901 and 902 as well as the speed of fan 909. The fan speed can be monitored by monitoring the speed of either motor 901 or 905 since both motors are directly coupled to the same fan.

After blower fan 909 has reached its predetermined operating speed, controller 911 monitors the operating current in motors 901 and 905. The operating current of each motor is directly proportional to its operating load. If controller 911 determines that the operating currents of the two motors is unbalanced, speed control signals are sent by controller 911 to either one or both motor drive circuits, 903 and 907. By applying different speed control signals to the motors, the load on the individual motors is varied thus preventing one motor from carrying a greater load than the other motor. Once controller 911 has matched the operating currents of motors 901 and 905 to within the predetermined operating tolerances, the speed of the fan is again checked. If the speed of the fan is still within the predetermined operating tolerances, then the motors are allowed to continue to run at the selected speeds and all three parameters are periodically checked to insure that they remain within tolerance. If the speed of the fan is not within the predetermined operating tolerance, controller 911 adjusts the speeds of the two motors and then repeats the operation of attempting to match the operating currents of the two motors.

Figure 10:
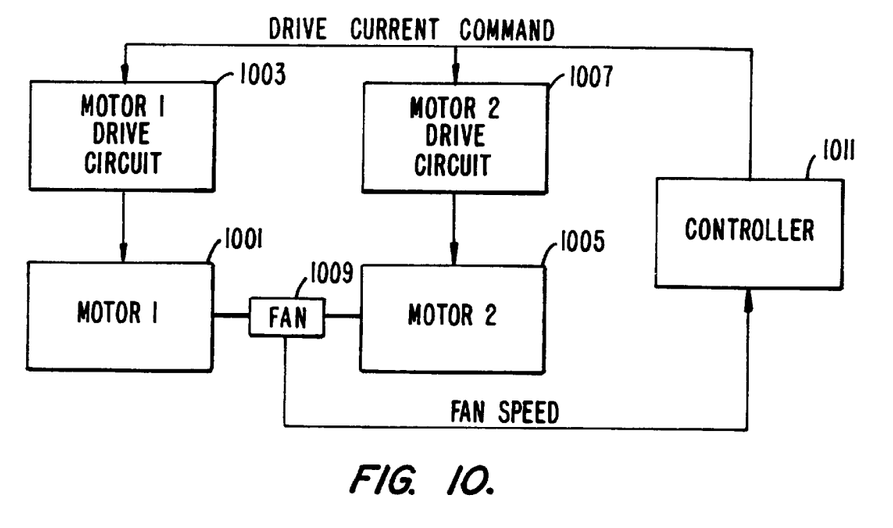
FIG. 10 illustrates an embodiment of the blower speed control system according to the present invention.

FIG. 10 illustrates an embodiment of the blower speed control according to the present invention. As in the prior art, the system has a first motor 1001, a first motor drive circuit 1003, a second motor 1005, a second motor drive circuit 1007, a fan 1009, and a controller 1011. In this system controller 1011 monitors the speed of the fan by monitoring the speed of either motor 1001 or 1005. If the speed of the fan is incorrect, controller 1011 sends out a single drive current command, either to increase or decrease the drive current of the motors. Therefore the drive current of both motors is simultaneously changed, thus eliminating the necessity of matching motor loads as in the prior art. Furthermore, since controller 1011 sends out a single drive current command, the same circuit can be used with either a single blower motor, as in FIGS. 3–5, or with a dual motor system, as shown in FIG. 8.

Figure 11:
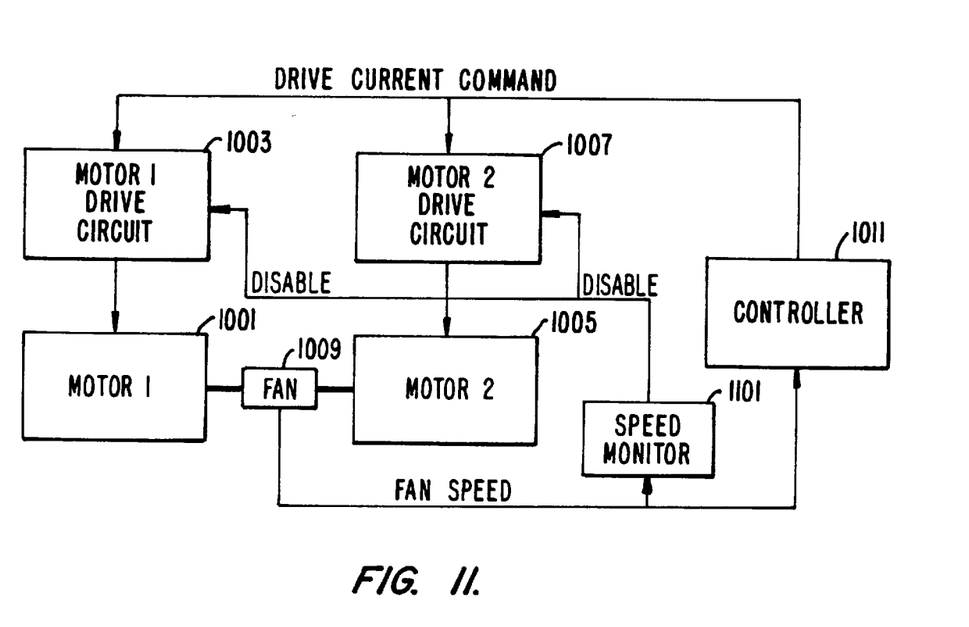
FIG. 11 illustrates an alternate embodiment of the blower speed control system shown in FIG. 10.
Figure 12:
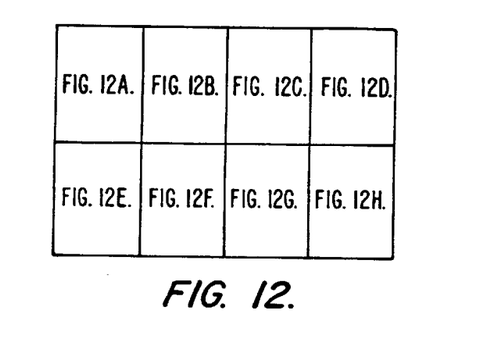
FIG. 12 and FIGS. 12A–H are an illustration of a portion of a laser control circuit which is used to control the blower fan according to the present invention.
Figure 12A:
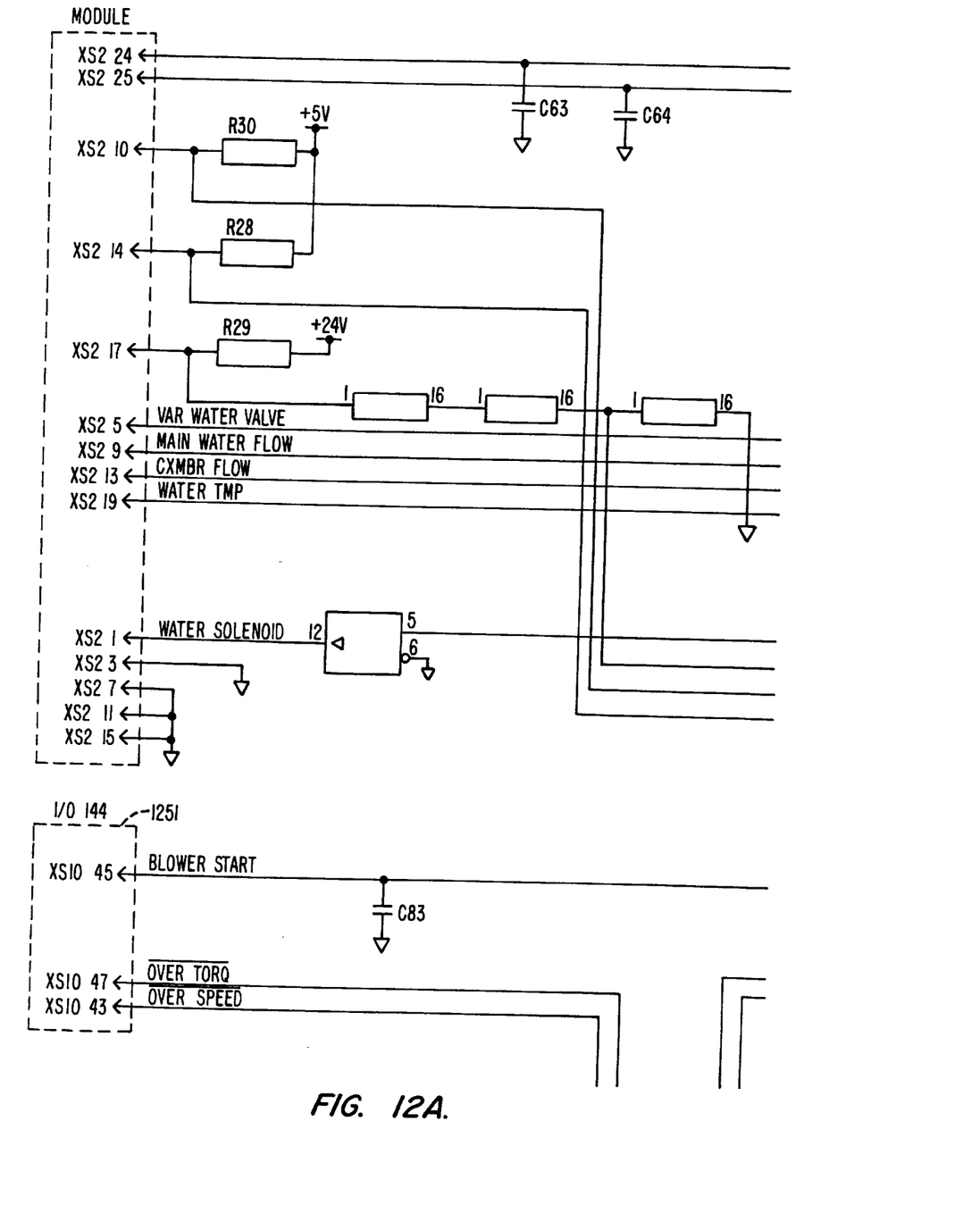
Figure 12B:
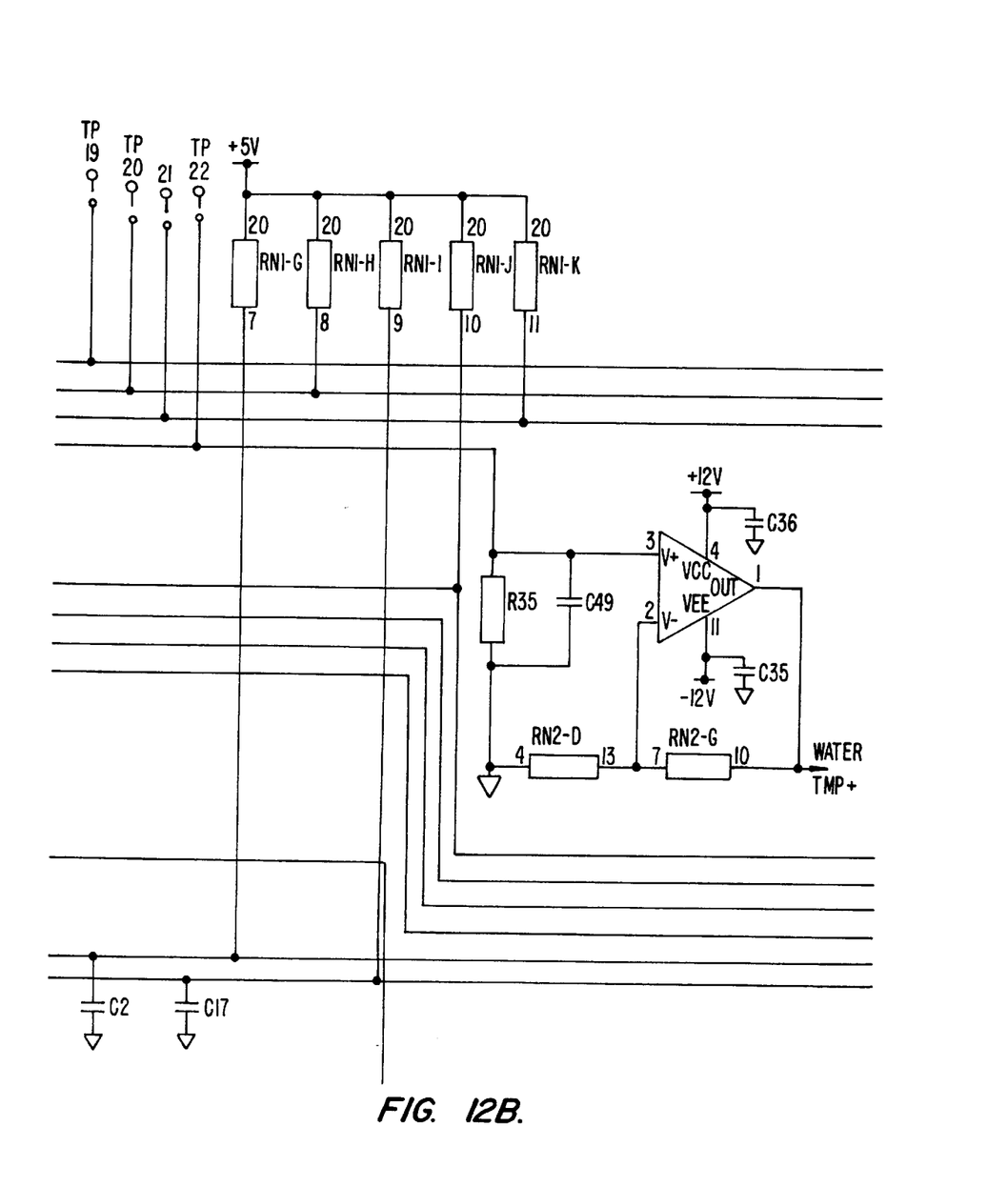
Figure 12C:
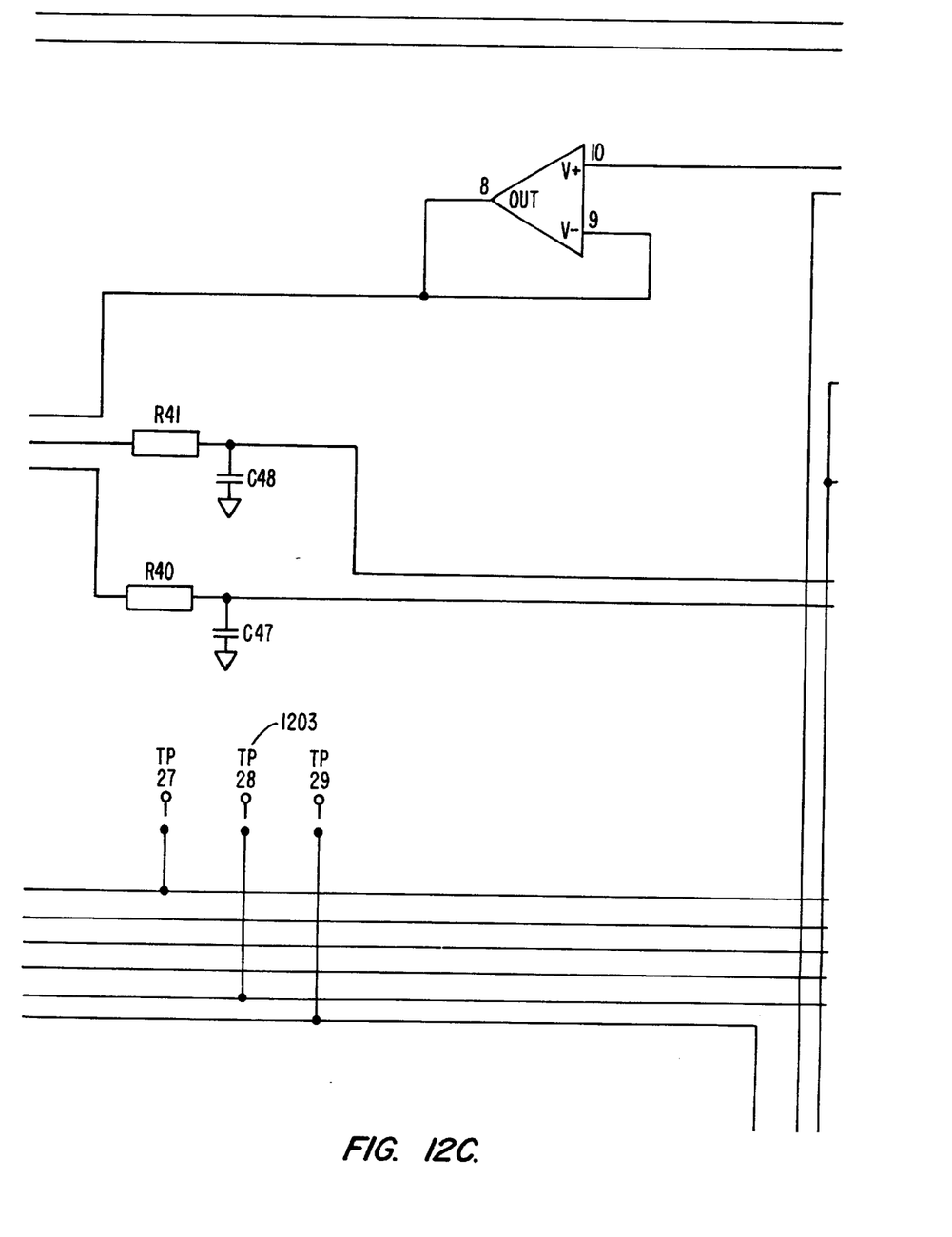
Figure 12D:
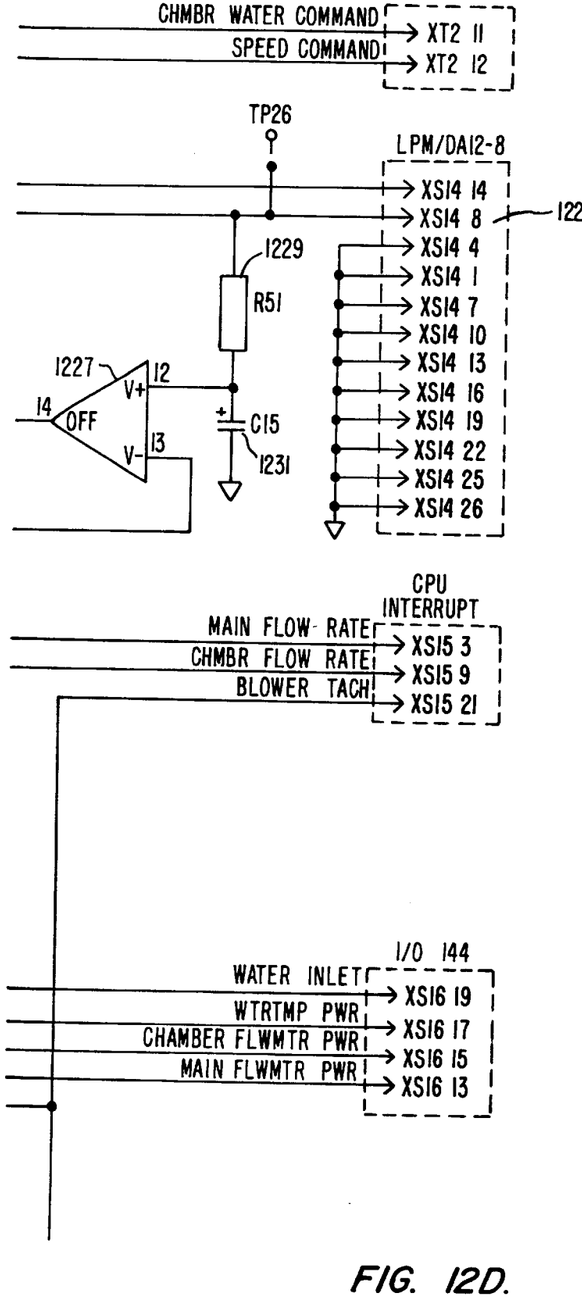
Figure 12E:
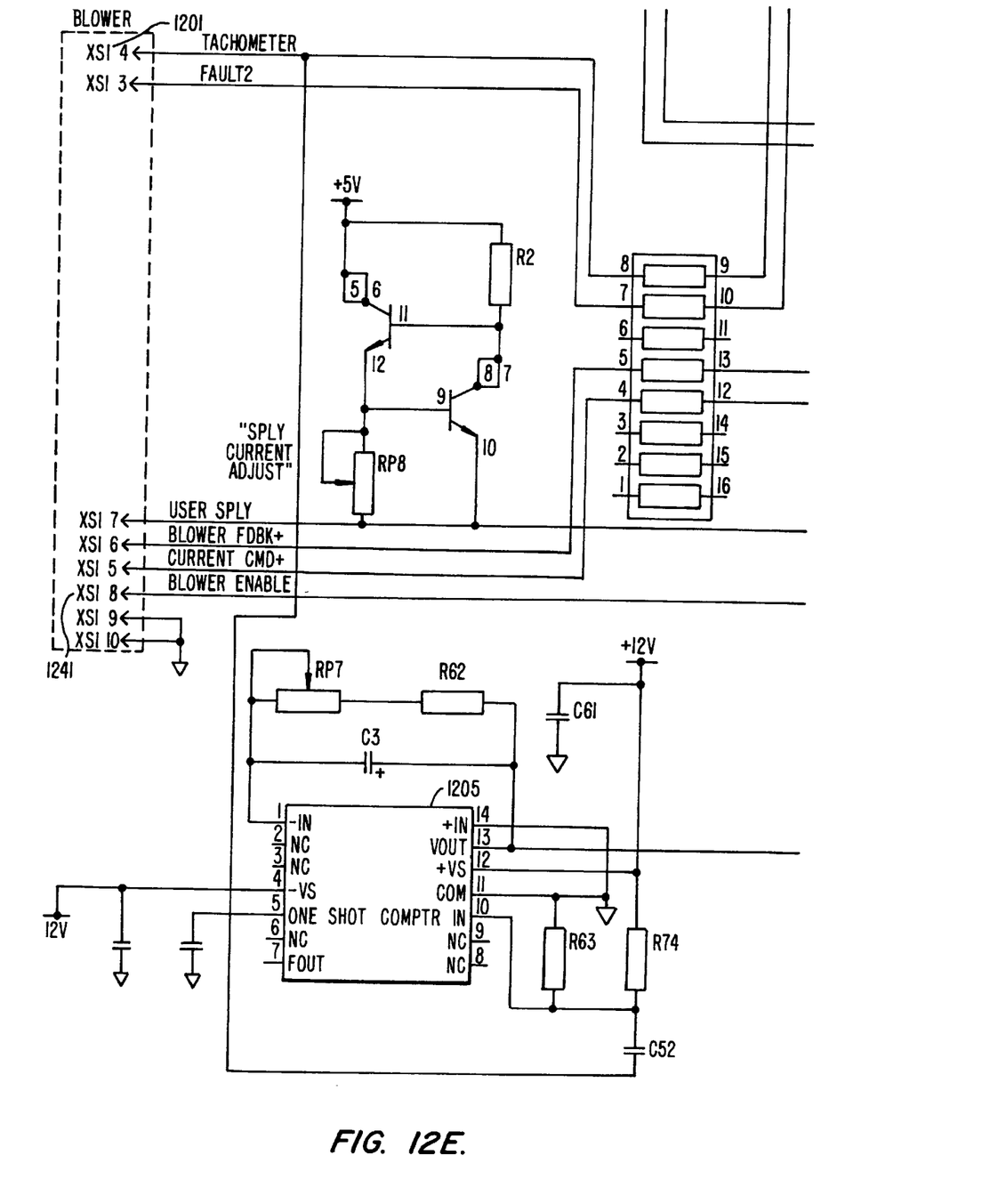
Figure 12F:
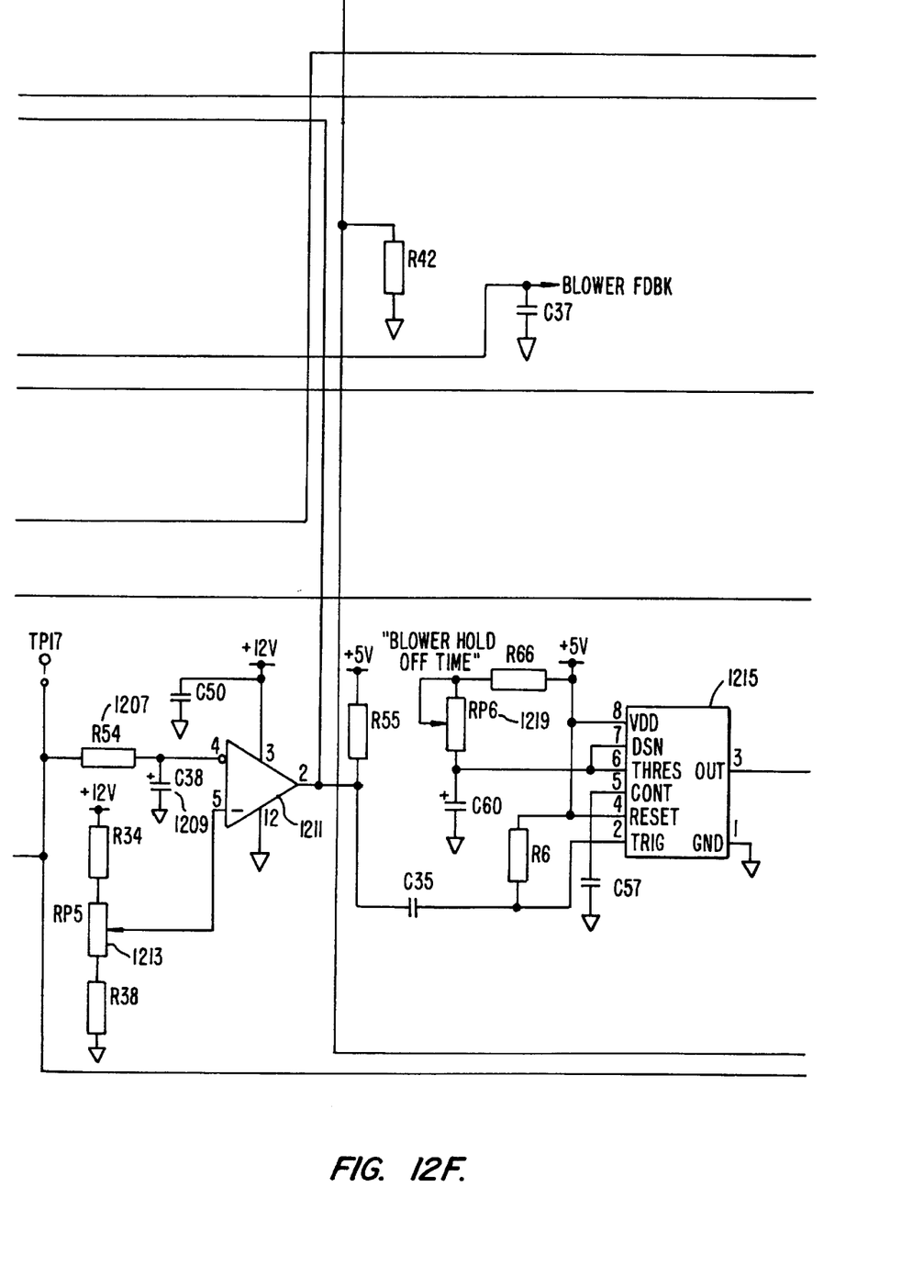
Figure 12G:
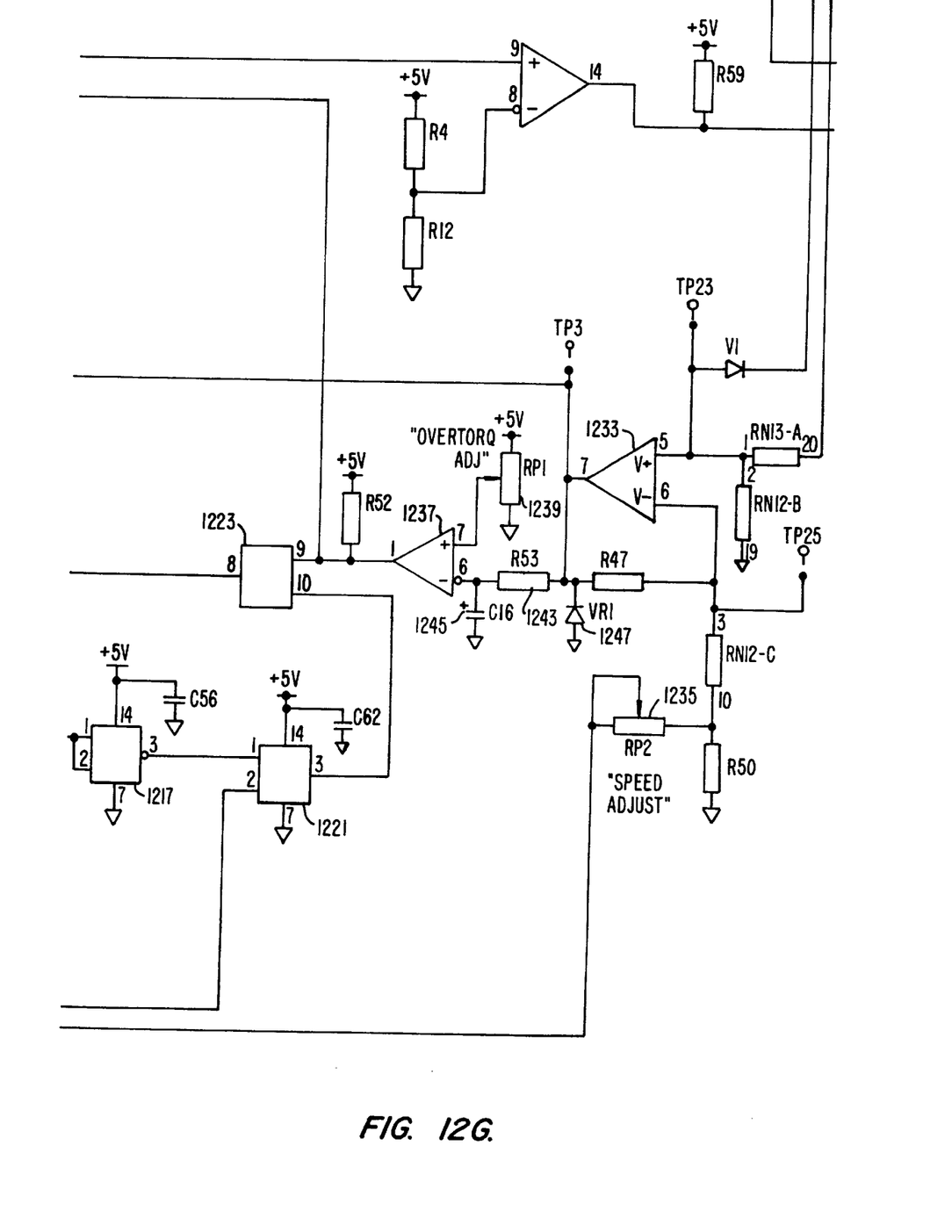
Figure 12H:
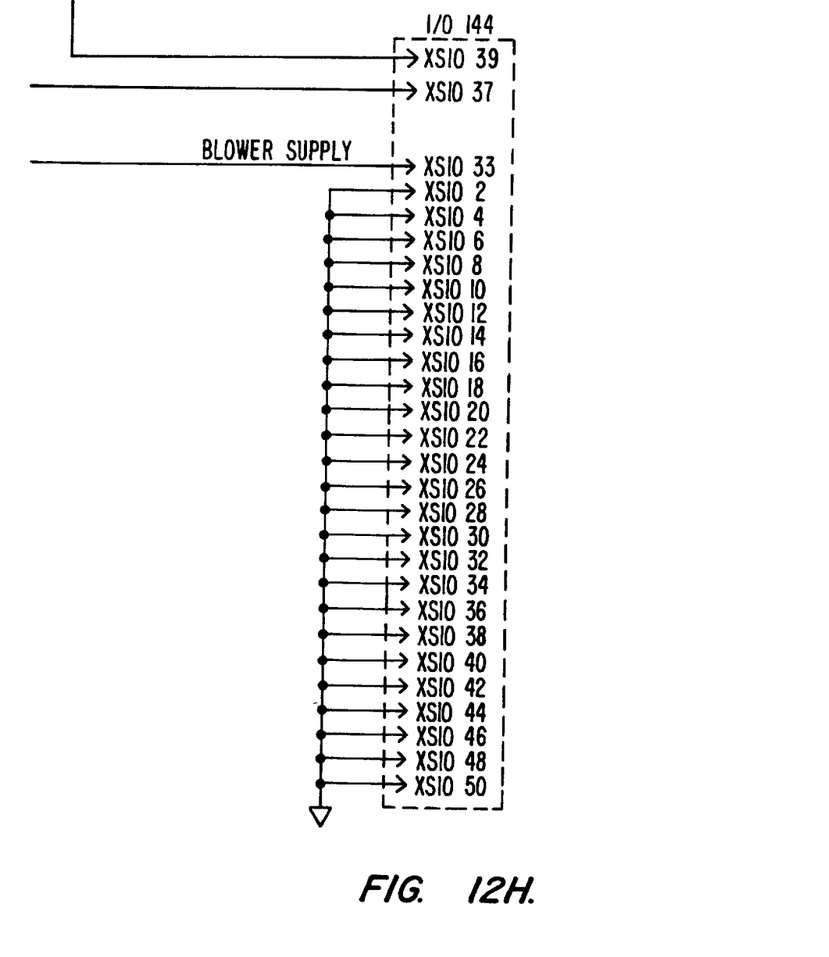

FIG. 11 illustrates an alternate embodiment of the blower speed control system shown in FIG. 10. The two systems are identical except the one shown in FIG. 11 has a blower fan protection circuit 1101 which prevents the motors from being damaged by operating at too high of a speed. In this embodiment protection circuit 1101 continually compares the fan speed with a preset maximum limit. If the fan speed exceeds the preset limit, a disable signal is sent to the motor drive circuits which prevents further operation of the motors until the disable signal is removed. In the preferred embodiment, the disable signal is sent for a predetermined period of time, after which the operation of the motors can be reinitiated. The protection circuit may also be used with a single motor system.

FIGS. 12A–H illustrate a portion of a laser control circuit which is used to control the blower fan according to the present invention. Tachometer input signal, seen on connector 1201 (test point 1203), is a TTL level pulse train from the blower controller. The frequency is proportional to the motor speed. IC 1205 is a frequency-to-voltage converter which converts pulses at pin 10 to a DC voltage at pin 13. This DC voltage is delayed by the combination of resistor 1207 and capacitor 1209 for almost 1 second to prevent the system from oscillation. The delayed voltage at pin 4 of comparator 1211 is compared with another voltage at pin 5 which is set by potentiometer 1213.

When the blower speed goes higher than this set point, pin 2 at the output of comparator 1211 goes low and generates an over-speed signal. This signal is sensed by the controller which then shuts the blower off and brings the system down to STANDBY. This output also triggers IC 1215 which is a monostable timer. Pin 3 of this timer is normally low which is inverted to high TTL level by NAND gate 1217.

When the timer is triggered by an over speed signal, pin 3 of the timer goes high for the duration that can be adjusted by potentiometer 1219. In the preferred embodiment this duration is set at 30 seconds. When pin 3 of the timer goes high, then pin 3 of NAND gate 1217 goes low which causes pin 3 of gate 1221 to go low. This, in turn, will switch pin 8 of gate 1223 to low which turns the blower off for 30 seconds. During this time the computer will not be able to turn the blower on. The 30 second off period acts as a watchdog timer that prevents the controller from turning the blower on after an over-speed condition.

Software controls the speed of the blower motor by sending control voltage through connector 1225. This voltage is delayed for almost 2 seconds at pin 12 of comparator 1227 by resistor 1229 and capacitor 1231. This control voltage is then compared with the voltage from pin 12 of IC 1205. The result of this comparison generates the command voltage at pin 7 of comparator 1233. The speed of the blower can be adjusted by adjusting potentiometer 1235. When blower speed goes lower than the set value, then pin 6 of 1233 goes low proportionately which causes an increase on pin 7. This will increase the blower speed, which maintains the desired speed set by potentiometer 1235 and by the analog control signal from the computer. If the blower speed goes higher, the same changes will happen in the opposite direction, which means pin 6 will go higher and pin 7 will go lower, reducing blower speed ad compensating changes in the system and regulating blower speed. Therefore, although the speed is set by the software, speed control is achieved through hardware. When analog control voltage from the computer increases, for example due to a malfunction in the system or blower overload, and the speed of the blower does not increase proportionately, then the voltage at pin 5 of 1233 will go higher than pin 6, which will increase the voltage at pin 6 of 1237. This voltage is compared with another voltage which is set by potentiometer 1239. When the voltage on pin 6 of 1237 goes higher than the set value, then pin 1 will go low, causing pin 9 of AND gate 1223 to go low, which in turn will bring connector 1241 to low. This will turn the blower off. Also, software will sense over-torque signal at pin 1 of 1237. There is a 1 second delay at pin 6 of 1237 to prevent the system from oscillation. Resistor 1243 and capacitor 1245 provide this delay. There is also a 5.1 volt Zener diode 1247 provided at pin 7 of 1233 which prevents the blower from overspeed. To start the blower, software will bring Blower Start voltage at connector 1251 to high TTL level, which goes to pin 2 of 1221.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

We claim:

1. A laser gas circulating system, comprising:

a laser cavity;

at least two discharge electrodes mounted within said laser cavity, said discharge electrodes defining a laser discharge area;

a fan mounted within said laser cavity, said fan coupled to a drive shaft, said drive shaft extending through an exterior surface of said laser cavity, wherein said fan circulates a gas within said laser cavity through said laser discharge area; and a brushless DC motor mounted to said exterior surface of said laser cavity, said motor comprising:

a rotor coupled to said fan drive shaft;

a stator surrounding a central axis of said rotor;

a sealing member interposed between said rotor and said stator, said sealing member partially enclosing said rotor, said sealing member sealed to said exterior surface of said laser cavity, said sealing member preventing said stator from being exposed to said gas;

a stator housing surrounding said stator;

a stator housing end cap releasably attached to an end portion of said stator housing, wherein said end cap is finned for improved cooling;

at least one sensor mounted to said end cap at a location proximate to said rotor and proximate to said stator, said sensor providing rotor position information; and an insulator between said sensor and said rotor and said stator, wherein said insulator is fixably attached to said end cap.

2. The laser gas circulating system of claim 1, wherein said insulator thermally insulates said sensor from heat generated by said rotor and said stator.

3. The laser gas circulating system of claim 1, wherein said insulator electrically insulates said sensor from a voltage applied to said stator.

4. The laser gas circulating system of claim 1, wherein said insulator is a cup fixably attached to said end cap, wherein said cup is comprised of a polyimide material.

5. The laser gas circulating system of claim 1, wherein said location of said sensor relative to said stator is adjustable.

6. The laser gas circulating system of claim 5, wherein said adjustment can be made while said motor is running.

7. The laser gas circulating system of claim 1, wherein said sensor is a Hall sensor.

8. A laser gas circulating system, comprising:

a laser cavity;

at least two discharge electrodes mounted within said laser cavity, said discharge electrodes defining a laser discharge area;

a fan mounted within said laser cavity, said fan coupled to a drive shaft, said drive shaft extending through an exterior surface of said laser cavity, wherein said fan circulates a gas within said laser cavity through said laser discharge area; and a brushless DC motor mounted to said exterior surface of said laser cavity, said motor comprising:

a rotor coupled to said fan drive shaft;

a stator surrounding a central axis of said rotor;

a sealing member interposed between said rotor and said stator, said sealing member partially enclosing said rotor, said sealing member sealed to said exterior surface of said laser cavity, said sealing member preventing said stator from being exposed to said gas;

at least one non-contacting sensor adjustably mounted at a location proximate to said rotor and proximate to said stator, said sensor providing rotor information, said rotor information used to control a phase timing of the motor, wherein adjustment of said sensor location alters said sensor location relative to said stator, said adjustment changing said phase timing;

a rotatable end cap, said sensors coupled to said end cap, wherein adjustment of said sensor location is performed by rotating said end cap with respect to said stator; and at least one locating pin indirectly coupled to said stator, said locating pin complementally fitted to a slot within said end cap.

9. The laser gas circulating system of claim 8, wherein said locating pin is a bolt.

10. A laser gas circulating system, comprising:

a laser cavity;

at least two discharge electrodes mounted within said laser cavity, said discharge electrodes defining a laser discharge area;

a fan mounted within said laser cavity, said fan coupled to a drive shaft, said drive shaft extending through an exterior surface of said laser cavity, wherein said fan circulates a gas within said laser cavity through said laser discharge area; and a brushless DC motor mounted to said exterior surface of said laser cavity, said motor comprising:

a rotor coupled to said fan drive shaft;

a stator surrounding a central axis of said rotor;

a sealing member interposed between said rotor and said stator, said sealing member partially enclosing said rotor, said sealing member sealed to said exterior surface of said laser cavity, said sealing member preventing said stator from being exposed to said gas;

at least one non-contacting sensor adjustably mounted at a location proximate to said rotor and proximate to said stator, said sensor providing rotor information, said rotor information used to control a phase timing of the motor, wherein adjustment of said sensor location alters said sensor location relative to said stator, said adjustment changing said phase timing;

a rotatable end cap, said sensors coupled to said end cap, wherein adjustment of said sensor location is performed by rotating said end cap with respect to said stator; and a stator housing, said stator housing having a plurality of timing marks on its circumference, said timing marks adjacent to a single indicator marking on said end cap.

11. The laser gas circulating system of claim 10, further comprising at least one locating pin rigidly coupled to said stator housing, said locating pin complementally fitted to a slot within said end cap.

12. A laser gas circulating system, comprising:

a laser cavity;

at least two discharge electrodes mounted within said laser cavity, said discharge electrodes defining a laser discharge area;

a fan mounted within said laser cavity, said fan coupled to a drive shaft, said drive shaft extending through an exterior surface of said laser cavity, wherein said fan circulates a gas within said laser cavity through said laser discharge area; and a brushless DC motor mounted to said exterior surface of said laser cavity, said motor comprising:

a rotor coupled to said fan drive shaft;

a stator surrounding a central axis of said rotor;

a sealing member interposed between said rotor and said stator, said sealing member partially enclosing said rotor, said sealing member sealed to said exterior surface of said laser cavity, said sealing member preventing said stator from being exposed to said gas;

at least one non-contacting sensor adjustably mounted at a location proximate to said rotor and proximate to said stator, said sensor providing rotor information, said rotor information used to control a phase timing of the motor, wherein adjustment of said sensor location alters said sensor location relative to said stator, said adjustment changing said phase timing; and a rotatable end cap, said sensors coupled to said end cap, wherein adjustment of said sensor location is performed by rotating said end cap with respect to said stator, and wherein said end cap is finned for improved cooling.

13. A laser gas circulating system, comprising:

a laser cavity;

at least two discharge electrodes mounted within said laser cavity, said discharge electrodes defining a laser discharge area;

a fan mounted within said laser cavity, said fan coupled to a drive shaft, said drive shaft extending through an exterior surface of said laser cavity, wherein said fan circulates a gas within said laser cavity through said laser discharge area; and a brushless DC motor mounted to said exterior surface of said laser cavity, said motor comprising:

a rotor coupled to said fan drive shaft;

a stator surrounding a central axis of said rotor;

a sealing member interposed between said rotor and said stator, said sealing member partially enclosing said rotor, said sealing member sealed to said exterior surface of said laser cavity, said sealing member preventing said stator from being exposed to said gas;

at least one non-contacting sensor adjustably mounted at a location proximate to said rotor and proximate to said stator, said sensor providing rotor information, said rotor information used to control a phase timing of the motor, wherein adjustment of said sensor location alters said sensor location relative to said stator, said adjustment changing said phase timing; and a rotatable end cap, said sensors coupled to said end cap, wherein adjustment of said sensor location is performed by rotating said end cap with respect to said stator, and wherein said end cap is actively cooled with thermoelectric coolers.

14. A laser gas circulating system, comprising:

a laser cavity;

at least two discharge electrodes mounted within said laser cavity, said discharge electrodes defining a laser discharge area;

a fan mounted within said laser cavity, said fan coupled to a drive shaft, said drive shaft extending through an exterior surface of said laser cavity, wherein said fan circulates a gas within said laser cavity through said laser discharge area; and a brushless DC motor mounted to said exterior surface of said laser cavity, said motor comprising:

a rotor coupled to said fan drive shaft;

a stator surrounding a central axis of said rotor;

a sealing member interposed between said rotor and said stator, said sealing member partially enclosing said rotor, said sealing member sealed to said exterior surface of said laser cavity, said sealing member preventing said stator from being exposed to said gas;

at least one non-contacting sensor adjustably mounted at a location proximate to said rotor and proximate to said stator, said sensor providing rotor information, said rotor information used to control a phase timing of the motor, wherein adjustment of said sensor location alters said sensor location relative to said stator, said adjustment changing said phase timing; and an insulator interposed between said non-contacting sensor and said rotor and said stator.

15. The laser gas circulating system of claim 14, wherein said insulator is comprised of a polyimide material.

* * * * *